Dec. 5, 1967     E. W. FRANKLIN     3,355,810
MEASURING DEVICE
Filed March 19, 1965     3 Sheets-Sheet 1
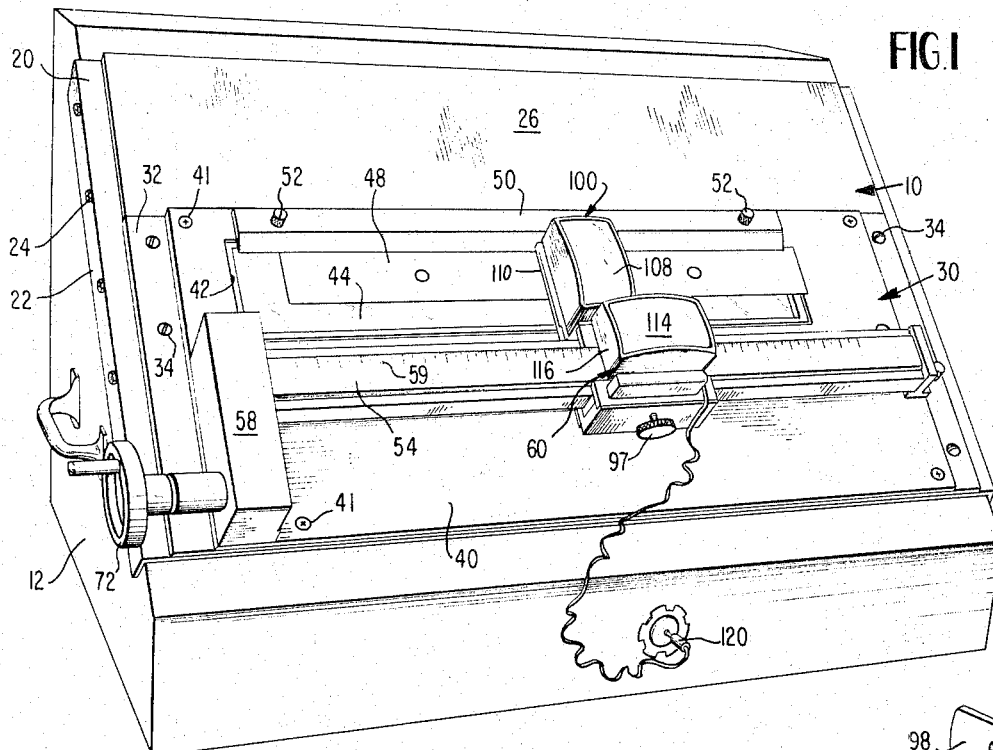
FIG.1
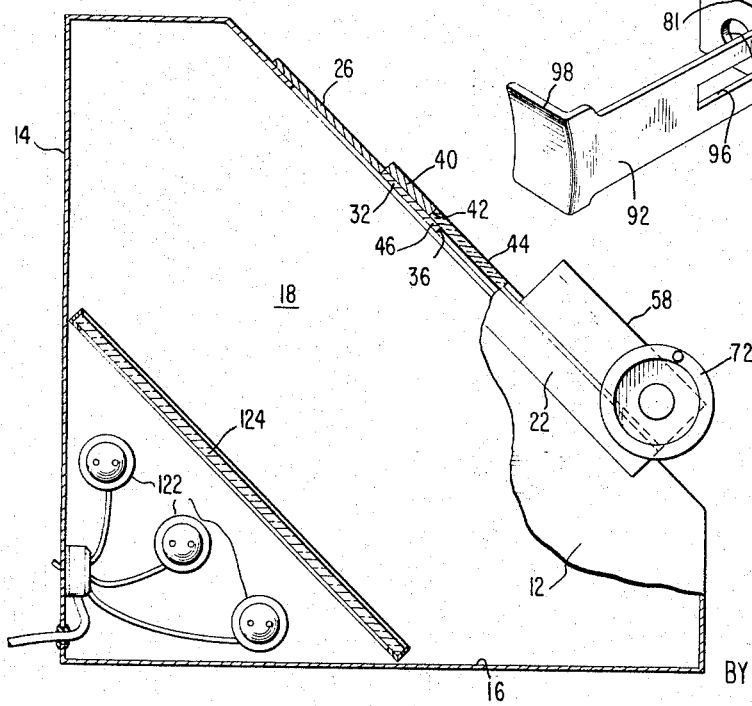
FIG.2
FIG.3
INVENTOR
EARL W. FRANKLIN
BY
ATTORNEYS

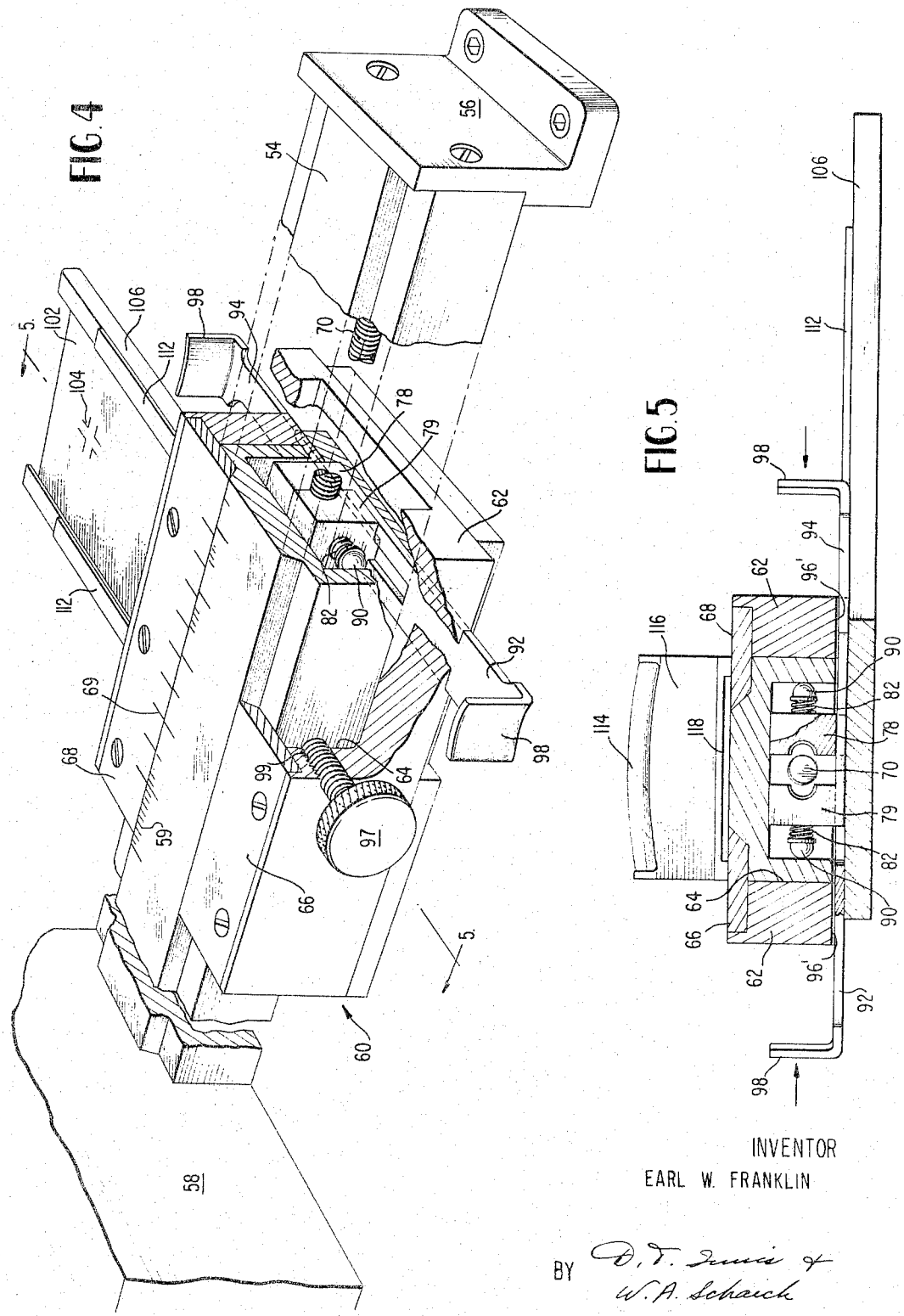

Dec. 5, 1967   E. W. FRANKLIN   3,355,810
MEASURING DEVICE

Filed March 19, 1965   3 Sheets-Sheet 3

*INVENTOR*
EARL W. FRANKLIN

BY

*ATTORNEYS*

United States Patent Office 3,355,810
Patented Dec. 5, 1967

3,355,810
MEASURING DEVICE
Earl W. Franklin, Toledo, Ohio, assignor to Owens-Illinois, Inc., a corporation of Ohio
Filed Mar. 19, 1965, Ser. No. 441,235
1 Claim. (Cl. 33—125)

ABSTRACT OF THE DISCLOSURE

The viewing face of a box which supports films for measurement is spaced away from the contained light source and diffusing plate. It has an aperture removably receiving a screw-fastened mounting plate. Similarly fastened over an aperture in the plate is a unit comprising a face plate framing a glass window and mounting a film clamping bar, a fixed scale, and disengageable screw drive means for moving a slide along the scale; the slide carrying a fiducial glass plate, and magnetically held magnifiers over the fiducial mark and the scale.

This invention generally relates to measuring devices and more specifically to a novel device particularly suitable for taking linear measurements from X-ray diffraction film, although not limited to the latter.

One of the objects of the present invention is to provide a measuring device of the aforedescribed type which may be operated and read quickly and easily and nevertheless will obtain highly accurate measurements.

A further object of the present invention is to provide such a device which is adaptable to various X-ray diffraction film shapes and sizes including those in common use, while being convertible into a tracing unit if desired.

A still further object of the present invention is to provide such a measuring device which may be economically manufactured from readily available parts and will experience a long life of dependable service.

Other objects will become apparent from the following description of the invention together with the accompanying drawings in which:

FIG. 1 is a perspective view of a measuring device embodying the present invention;

FIG. 2 is a transverse partial cross-sectional view of the device of FIG. 1 with certain portions removed;

FIG. 3 is a perspective view of a split nut included in the device;

FIG. 4 is an enlarged fragmental perspective view of a scale and associated slide included in the device;

FIG. 5 is a cross-sectional view taken generally along lines 5—5 of FIG. 4;

Figure 6:
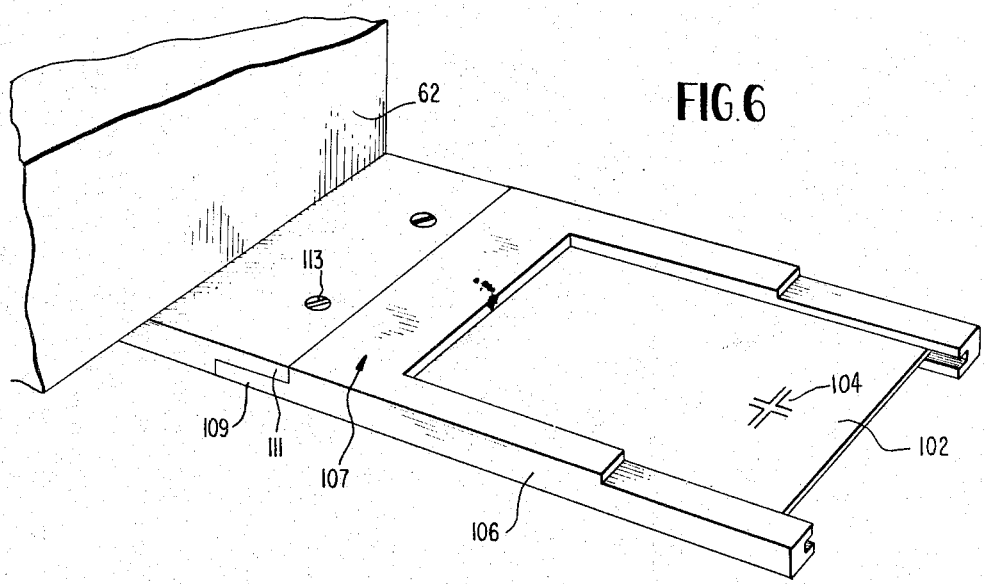
FIG. 6 is a fragmental perspective view of an optical plate and associated mounting member included in the device.

Referring to the drawings in detail, a device embodying the present invention is shown as including a box-like supporting frame comprised of an inclined top wall generally designated 10, opposite parallel side walls 12, a back wall 14 and a bottom wall 16 enclosing a compartment 18. In the illustrated embodiment, top wall 10 includes an apertured rectangular supporting frame 20 having flanges 22 extending along the opposite ends thereof in engagement with side walls 12 to which flanges 22 are secured by screws 24. Mounted across the upper portion of supporting frame 20 is a rectangular panel 26 formed of any suitable material, and mounted to supporting frame 20 below panel 26 is a film viewing and measuring unit generally designated 30.

Viewing unit 30 includes a mounting plate 32 fixed by screws 34 to frame 20 with one end of mounting plate 32 abutting the lower edge of panel 26. Mounting plate 32 is provided with a rectangular aperture 36 across its upper portion and fixed on mounting plate 32 in superimposed relation is a rectangular face plate 40. Face plate 40 has a rectangular aperture 42 aligned above aperture 36 in underlying mounting plate 32, and provided in face plate aperture 42 is a film support panel 44 preferably formed of transparent glass. Mounting plate aperture 36 is slightly less in size than face plate aperture 42 thus forming a narrow ledge 46 which supports glass panel 44 as shown in FIG. 2.

Film such as 48 from which measurements are to be taken is placed on glass panel 44 as shown in FIG. 1 and for securing film 48 in this position a clamping bar 50 is removably mounted to face plate 40 along the upper edge of aperture 40 by thumb screws 52.

Measurements relating to points on the film are taken from a linear scale 54 fixed on face plate 40 along the lower edge of glass panel 44. Referring to FIGS. 4 and 5, scale 54 has an inverted generally U-shaped cross-section and is mounted to face plate 40 at its opposite ends by means of an L-shaped bracket 56 screwed to face plate 40 and a small box 58 whose purpose will be described subsequently. Graduations 59 for measuring linear distance are formed in the upper face of scale 54 as shown in FIGS. 1 and 4.

For taking linear measurements from scale 54 corresponding to points on the film, a slide mechanism generally designated 60 is mounted for slidable movement on scale 54. Slide mechanism 60 includes a generally U-shaped body 62 having a longitudinal U-shaped passage 64 which slidably receives scale 54 as shown in FIGS. 4 and 5. Slide mechanism 60 further includes top plates 66 and 68 screwed in opposed relationship to slide body 62 so as to be slidable along opposite sides of scale 54. Top plate 68 is provided with vernier graduations 69 for obtaining a precise measurement.

Precise actuation of slide mechanism 60 to a position corresponding to a point on the film is by means of an elongated screw shaft 70 suitably journalled for rotation in the longitudinal passage of scale 54. Screw shaft 70 is manually rotated by means of a spindle 72 connected to screw shaft 70 through suitable gearing (not shown) housed by box 58.

Movement of screw shaft 70 is imparted to slide mechanism 60 to move the same along scale 54 by means of a split nut 76 which includes a pair of opposed block-like elements 78 and 79 having semi-cylindrical threaded passages 80 and 81 corresponding to those of screw shaft 70. Urging split nut elements 78 and 79 into engagement with screw shaft 70 to cause movement of the split nut along screw shaft upon rotation of the latter are a pair of springs 82 mounted in recesses 86 in opposite sides of the split nut elements. Ball thrust elements 90 are received in the outer ends of springs 82 and engage against the internal sides of scale 54 as shown in FIG. 5.

Movement of split nut 76 beneath scale 54 is imparted to slide mechanism 60 by arms 92 and 94 projecting laterally from the bottom of split nut elements 78 and 79 as shown in FIG. 3 respectively. Arm 92 of split nut element 78 has a longitudinal slot 96 which receives arm 94 of split nut element 79, the latter resting on arm 92. Split nut arms 92 and 94 extend transversely through the bottom portion of slide body 62 where they are received in transverse passages 96 formed in slide body 62 to permit the arms to be moved toward and away from each other but to prevent relative movement between the arms and the slide mechanism in the direction of the scale.

Disengagement of split nut 76 from screw shaft 70 and direct actuation of slide mechanism 60 is affected by laterally depressing split nut arms 92 and 94 inwardly against the bias of springs 82. This latter operation is conveniently accomplished in the shown embodiment through flanges 98 provided on the ends of the split nut arms.

To lock the slide in any desired position against movement, a thumb screw 97 is provided in a threaded passage 99 which extends to the side of slide body 62 as shown in FIG. 4. Thumb screw 97 may be engaged or disengaged with the side of scale 54 to respectively prevent or permit movement of the slide mechanism.

In accordance with one aspect of the present invention, an optical attachment, generally designated 100, for sighting on the film under observation, is fixed to slide mechanism 60 for movement therewith. In the illustrated embodiment this optical attachment includes a rectangular glass plate 102 extending across the film support glass panel 44 and provided with a suitable fiducial mark 104. Slidably receiving glass plate 102 to mount it with respect to slide body 62 are a pair of channel members 106 projecting laterally at right angles from the bottom of slide body 62 where channel members 106 are fixed. In the specific form shown in FIG. 6 channel members 106 have a generally U shape cross-section and are formed as integral arms of a generally U shape element 107. As illustrated in FIG. 6, element 107 has a transverse stepped portion 109 dimensioned to fit under a corresponding stepped portion 111 formed as an integral laterally projecting part of slide 60. Stepped portions 109 and 111 may be secured together such as by screws 113.

Figure 7:
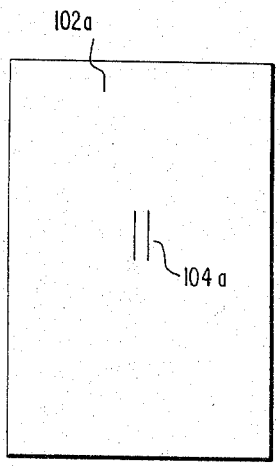
FIGS. 7, 8 and 9 are plan views of optical plates illustrating various fiducial marks which may be employed with the device of the present invention.
Figure 8:
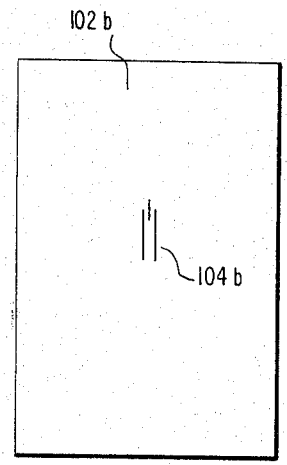
Figure 9:
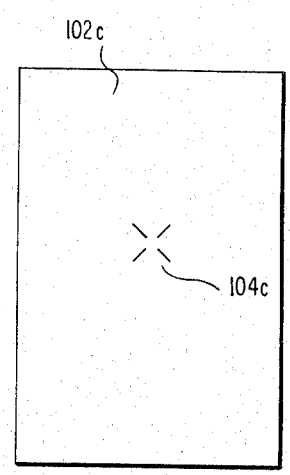

Mounting element 107, with its arms 106, thus permits optical plate 102 to be easily removed and replaced by another palte such as for example when it is desired to employ other fiducial marks as may be suitable to a particular X-ray line pattern. In this regard FIGS. 7, 8 and 9 illustrate three interchangeable optical plates 102a, 102b, 102c with different fiducial marks 104a, 104b and 104c respectively. Removal and replacement of the optical plates is simply effected by sliding the optical plates along the longitudinal passages or grooves of the channel members 106. In addition to plates 102, 102a, 102b and 102c, it will be appreciated that plates with other fiducial mark patterns may be accommodated by the device of the present invention.

To facilitate reading the film, a magnifying lens 108 having a suitable holder 110 is mounted over glass plate 102 as shown in FIG. 1. In the preferred embodiment, this mounting of the magnifying lens 108 is accomplished by a pair of magnetic elements 112 located on channels 106 to be magnetically engageable with holder 110 of magnifying lens 108. Magnetic elements 112 may be provided by separate strips or by integral portions of channel members 106.

Similarly a magnifying lens 114 having a holder 116 is provided for reading scale 54. Magnifying lens 114 may be mounted to top plates 66 and 68 of slide body 62 in any suitable manner preferably by a magnetic plate such as 118 which extends across scale 54 with its ends magnetically engaged on slide top plates 66 and 68 as shown in FIG. 5. Preferably magnifying lens 114 is provided with a light (not shown) controlled by a switch 120 (see FIG. 1) for illuminating the scale.

In order to illuminate the film being read, a source of light, preferably fluorescent lamps 122 are provided in compartment 18 below film support panel 44 as shown in FIG. 2. Fluorescent lamps 122 are positioned in the corner of compartment 18 to be removed as far as possible from the film so as to minimize heating and consequent expansion of the film. Additionally, a frosted glass plate 124 is suitably fixed in compartment 18 in close overlying relationship to fluorescent lamps 122 to substantially eliminate heat transmission to the film from the fluorescent lamps.

In use, assuming that the distance between two points on an X-ray film is to be measured, the film is placed on glass panel 44 and clamped in fixed position below bar 50 by advancing screws 52. Fluorescent lamps 122 are then energized to illuminate the film. Slide mechanism 60 is then directly actuated by depressing split nut arm flanges 98 and manually moving the slide along the scale until fiducial mark 104 on the glass plate 102 is substantially close to one of the two points on the film whose intervening distance is to be measured. Split nut arm flanges 98 are then released to re-engage split nut 76 with screw shaft 70 whereupon spindle 72 is actuated to precisely align fiducial mark 104 above the point on the film. When this latter step is accomplished lock screw 97 is advanced to lock the slide mechanism in position and then the light of scale magnifying lens 114 is switched on and a reading taken from scale 54.

The above procedure is repeated to obtain a reading from the scale corresponding to the other point on the film and the desired distance between the points is simply ascertained by subtraction.

If desired the device may be converted for tracing by removing screws 41 which attach face plate 40 to underlying mounting plate 32 and removing face plate 40 and substituting a glass panel.

As will be apparent to persons skilled in the art, various modifications and adaptations of the structure above described will become readily apparent without departure from the spirit and scope of the invention covered by the appended claims.

What is claimed is:

A measuring device comprising a box-like enclosure having an inclined top supporting frame including an aperture, a mounting plate having an aperture therethrough and screws removably securing said mounting plate to said top supporting frame with the apertures of said top supporting frame and mounting plate in alignment, a face plate having a transparent area dimensioned to receive an article to be measured and screws removably securing said face plate on the top surface of said mounting plate with the transparent area overlying said apertures, securing means on said face plate on one side of said transparent area for holding the article to be measured against movement, a linear scale fixed on said face plate on the opposite side of said transparent area, slide means mounted on said scale for movement therealong, a magnifying lens fixed on said slide means above graduations on said scale, a glass plate having a fiducial mark extending across said transparent area in close generally parallel relationship with said transparent area, means fixing one end of said glass plate to said slide means for movement therewith, a second magnifying lens, magnetic means fixing said second magnifying lens on said glass plate over said fiducial mark, a source of light in said enclosure remote from said transparent area leaving a substantial space located between the source of light and said transparent area, and a frosted glass plate fixed in said enclosure over said source of light to diffuse the light for proper illumination while also substantially minimizing transmission of heat from said source of light to said transparent area.

References Cited

UNITED STATES PATENTS

| | | | |
|---|---|---|---|
| 1,887,288 | 11/1932 | Clausen | 240—2 |
| 2,328,762 | 9/1943 | Webster | 33—125 |
| 2,376,303 | 5/1945 | Woytych | 33—125 |
| 2,424,619 | 7/1947 | Keepers | 33—125 |
| 2,496,099 | 1/1950 | Leto | 33—1 |
| 3,089,243 | 5/1963 | Gerber | 33—1 |

FOREIGN PATENTS

| | | |
|---|---|---|
| 1,760 | 11/1845 | France. |
| 338,186 | 11/1930 | Great Britain. |
| 395,514 | 7/1933 | Great Britain. |
| 357,202 | 11/1961 | Switzerland. |

OTHER REFERENCES

American Machinist, August 30, 1945, page 113.

ROBERT B. HULL, *Primary Examiner.*